(12) United States Patent
Doty

(10) Patent No.: US 6,825,804 B1
(45) Date of Patent: Nov. 30, 2004

(54) INTERFERENCE-AIDED NAVIGATION WITH CYCLIC JAMMER CANCELLATION

(75) Inventor: James H. Doty, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 64 days.

(21) Appl. No.: 10/616,467

(22) Filed: Jul. 9, 2003

(51) Int. Cl.[7] .............................................. H04B 7/185
(52) U.S. Cl. ................................................ 342/357.12
(58) Field of Search ...................... 342/357.06, 357.07, 342/357.11, 357.12, 357.15

(56) References Cited

U.S. PATENT DOCUMENTS

| | | | | |
|---|---|---|---|---|
| 5,317,322 A | * | 5/1994 | Grobert ....................... | 342/378 |
| 5,712,641 A | * | 1/1998 | Casabona et al. ............ | 342/362 |
| 5,872,540 A | * | 2/1999 | Casabona et al. ............ | 342/362 |
| 6,163,021 A | | 12/2000 | Mickelson ................... | 244/3.2 |
| 6,208,936 B1 | | 3/2001 | Minor et al. ................. | 701/220 |
| 6,520,448 B1 | | 2/2003 | Doty et al. .................. | 244/3.23 |
| 6,529,568 B1 | * | 3/2003 | Richards et al. ............. | 375/346 |
| 6,587,078 B1 | | 7/2003 | Doty ........................... | 342/383 |
| 2004/0012526 A1 | * | 1/2004 | Casabona et al. ............ | 342/428 |

OTHER PUBLICATIONS

Co–pending Patent Application No. 10/123,928, entitled, "Interference–Aided Navigation For Rotating Vehicles".

* cited by examiner

*Primary Examiner*—Dao Phan
(74) *Attorney, Agent, or Firm*—Nathan O. Jensen; Kyle Eppele

(57) ABSTRACT

An interference-aided signal acquisition and tracking system includes a vehicle, an interference detector, a noise canceller, and a signal processor. The vehicle has at least two receivers configured to detect external signals and the at least two receivers have an output dependent on attitude of the vehicle. The interference detector measures the output of at least one of the at least two receivers. The noise canceller combines the output of the at least two receivers. The signal processor extracts a desired signal from the output of the noise canceller. The output of the interference detector is used to control the noise canceller as to reject unwanted signals and enhance performance of the signal processor in extracting the desired signal.

17 Claims, 15 Drawing Sheets

FIG. 12 — INTERFERENCE AMPLITUDE
--- DEMODULATION

US 6,825,804 B1

INTERFERENCE-AIDED NAVIGATION WITH CYCLIC JAMMER CANCELLATION

FIELD OF THE INVENTION

The present invention relates to navigation and guidance of vehicles and/or projectiles. Specifically, the present invention relates to the navigation and guidance of rotating vehicles under conditions of RF interference or jamming. More particularly, the present invention relates to interference-aided navigation with cyclic jammer cancellation.

BACKGROUND OF THE INVENTION

In many applications, such as artillery shell or missile guidance, the vehicle (e.g., munitions, ordnance) to be guided is spinning rapidly. Guidance systems integral to such spinning vehicles require significant real-time processing capacity because all of the sensor inputs and guidance actuator controls must be corrected to account for the effects of the spinning body. Neutralizing these unwanted rotational artifacts can only be accomplished if the orientation of the spinning body can also be determined in real-time. Practically speaking, it is difficult to determine the rotational orientation of a spinning body. Gyros have traditionally been used to sense orientation. Use of gyros in these kinds of applications is problematic because the scale-factor errors exhibited by spin-axis gyroscopes result in significant cumulative attitude estimate error.

Other techniques for determining the attitude of a spinning vehicle have included the use of spinning accelerometers or strain sensors mounted on a spinning wheel. These prior art apparatus provide for the measurement of the vehicle's rotation-rate. Measurements, utilizing spinning accelerometers are referred to as Coriolis rate measurements because of sinusoidal Coriolis acceleration artifacts they include. To remove these artifacts, the sensor signals must be demodulated. This demodulation normally involves a secondary sensor that indicates the rotational position of the spinning wheel relative to the body of the spinning vehicle. Such secondary rotational orientation sensors might include sun trackers or magnetic field sensors. These types of sensors may not be appropriate for every environment and they may not work well in certain geographic regions when the vehicle is aligned with the earth's magnetic field.

Certain difficulties are encountered in creating an effective navigation system for a rapidly spinning vehicle such as an artillery shell. Some researchers have proposed a system utilizing a magnetic field sensor for tracking the rotation angle of the vehicle and a system for computationally de-spinning the vehicle to greatly simplify calculation, and improve accuracy, of the navigation solution. Others have proposed utilizing a magnetic field sensor to de-spin the body-axis frame measurements and, in addition, used accelerometers to measure the Coriolis accelerations due to rotation. This proposal thereby eliminated the need for gyros and their associated rate range and scale factor limitations.

Use of a magnetic sensor, for roll determination in a spinning vehicle, can be effective under the correct circumstances. However, this approach requires the addition of a magnetic sensor and performance can be dependent on the magnetic properties of the vehicle and its electrical systems, as well as its position on the earth and the magnetic environment. For example, near the equator, a vehicle traveling approximately due north or south will have difficulty determining its rotation angle using a magnetic sensor.

In general, "interference signals" as referred to in the present application are external signals intended to jam or interrupt directional equipment on a vehicle. The interference signals received by a directional antenna on a rotating vehicle are typically of unknown or random amplitude and phase, but the power of the received signals are modulated as a function of the vehicle's rotation. It is possible to correlate the power modulation of the interference signal with the expected modulation over the possible range of rotation rates to determine the frequency and phase of the rotation relative to the interference source. The exact absolute phase of rotation is not initially known because the direction of the interference source is not generally known. However, once the rotation rate is determined, the system may systematically seek the desired navigation signal in directions relative to the interference source.

In the case of GPS (global positioning system), the navigation signals tend to be available from a number of different angles. Therefore, once the relative direction of the interference source or jammer is determined, the vehicle may search for valid GPS signals in directions generally opposite the jammer. If the vehicle contains multiple antenna elements, the output of these elements may be combined to significantly reduce the total gain in the direction of the interference source. This configuration is often referred to as a "null-steered antenna" because low-gain area or null of the composite antenna reception pattern is adjusted or steered to fall in the direction of the interference source. Techniques of antenna-array null-steering are well known. The basic concept is that the outputs of the individual antenna elements are phase and amplitude adjusted and combined such that the composite antenna pattern has very low gain in the direction of interference and higher gain in the direction of the desired signal.

FIG. 1 shows a block diagram for a conventional GPS receiver. The antenna signal is fed into a RF processing block that amplifies, filters, and mixes the signal down to an intermediate frequency signal $S_{IF}(t)$ that can be sampled by an A/D converter. The digitized output intermediate frequency signal $S_{IF}[n]$ is fed to the GPS signal processing where the navigation signal is extracted and tracked.

FIG. 2 shows a block diagram of a conventional beam forming system for non-spinning vehicles. The system consists of multiple antennas where each is connected to its own RF signal processing and A/D converter. The A/D converters generally have a high sample rate and dynamic range to accommodate both the desired and the much larger interference signal. Each of the A/D outputs may be adjusted in amplitude and phase by a modulation function (M on the figure). A null-steering controller adjusts the commands to the individual modulators so that the summed output has minimum gain in the direction of the jamming source, and acceptably high gain in other directions. With the interference signal significantly reduced, the dynamic range, sample rate, and IF frequency may be reduced to accommodate the limitations of the GPS signal processing.

U.S. Pat. No. 6,520,448, assigned to the assigned of the present application, describes a spinning-vehicle navigation system (ASVN) utilizing GPS or similar navigation signals to determine the rotation angle of the vehicle. This approach offers significant improvement in performance, and robustness under interference, once the navigation signals are acquired.

The applicant of the present application has also described a system to utilize signals from an interference source to determine the relative roll angle of the vehicle in co-pending patent application Ser. No. 10/123,928, (Atty. Dkt. No. 02CR169/KE) entitled "Interference-Aided Navigation for Rotating Vehicles." The applicant also describes how this rotation information may be utilized to drive a temporal beam former to enhance signal to noise performance of the system in issued U.S. Pat. No. 6,587,078, assigned to the assignee of the present application, entitled "Interference-Aided Navigation with Temporal Beam Forming in Rotating Vehicles."

Others have shown how inputs from multiple antennas may be combined to reduced interference signals. However, for rotating vehicles, it is recommended to utilize roll-independent antennas so that the phase and amplitude adjustments to the antenna signals may be made slowly. Although this approach eliminates the need for rapid control of the interference-cancellation system, the need to utilize a roll-independent antenna limits the effectiveness of cancellation and increases mechanical complexity of the antenna. In general, "roll-independent" antennas exhibit some residual phase and amplitude modulation with rotation which reduces the effectiveness of the noise cancellation. Also, roll-independent antenna geometries produce circular nulling patterns that that may have undesirable geometries that reduce the strength of desired signals.

Thus, there is a need for an interference-cancellation system that allows the use of simple directional antennas and provides improved jamming immunity. This need is particularly evident with GPS-aided artillery shells and other spinning vehicles operating in high-interference and jammed environments. Further, there is a need to control a roll-dependent phase and amplitude control function allowing antennas with roll-dependent amplitude and phase to be utilized. Even further, there is a need to provide improved jamming and interference resistance, and allow the use of low-cost directional antennas, eliminating problems associated with locating and installing roll-independent antennas. Yet still further, there is a need for an alternative or additional technique to temporal beam forming to improve receiver performance under conditions of high interference or jamming.

SUMMARY OF THE INVENTION

The present invention includes embodiments that aid in the acquisition and tracking of a GPS signal. These embodiments may be used alone or combined with other ASVN technologies to provide improved jamming and interference immunity in a wide range of rotating vehicle applications.

In particular, one exemplary embodiment relates to an interference-aided signal acquisition and tracking system. This system includes a vehicle, an interference detector, a noise canceller, and a signal processor. The vehicle has at least two receivers configured to detect external signals and the at least two receivers have an output dependent on attitude of the vehicle. The interference detector measures the output of at least one of the at least two receivers. The noise canceller combines the output of the at least two receivers. The signal processor extracts a desired signal from the output of the noise canceller. The output of the interference detector is used to control the noise canceller as to reject unwanted signals and enhance performance of the signal processor in extracting the desired signal.

Another exemplary embodiment relates to a method of signal acquisition and tracking including receiving external signals at a spinning vehicle, measuring the received external signals, modulating the received external signals to null an interference signal, and extracting a desired signal from the combined external signals.

Still another exemplary embodiment relates to a signal acquisition and tracking system where interference is cancelled for jamming immunity with spinning vehicles operating in interference environments. The system includes a number of signal receivers associated with a spinning vehicle, a rotation tracker that obtains signals from the number of signal receivers and provides a rotation estimate, a global positioning system (GPS) processor that provides satellite geometry information, and an interference cancellation controller that obtains the rotation estimate and the satellite geometry information and modulates to null interference received by the number of signal receivers.

BRIEF DESCRIPTION OF THE DRAWINGS

The exemplary embodiments in the present invention will be described with reference to the accompanying drawings, wherein like numerals denote like elements.

DETAILED DESCRIPTION OF EXEMPLARY EMBODIMENTS

Figure 1:
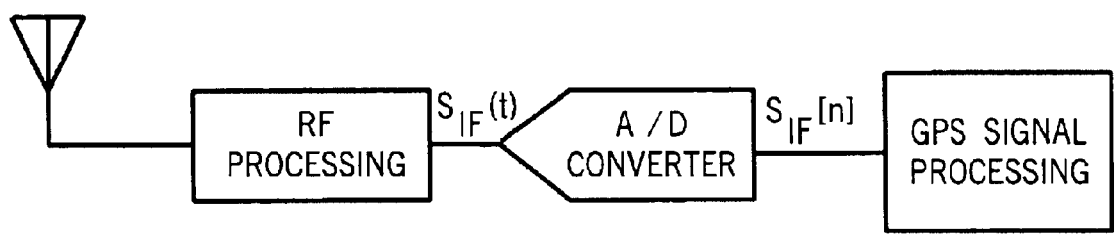
FIG. 1 is a block diagram of a conventional single-antenna GPS system.
Figure 2:
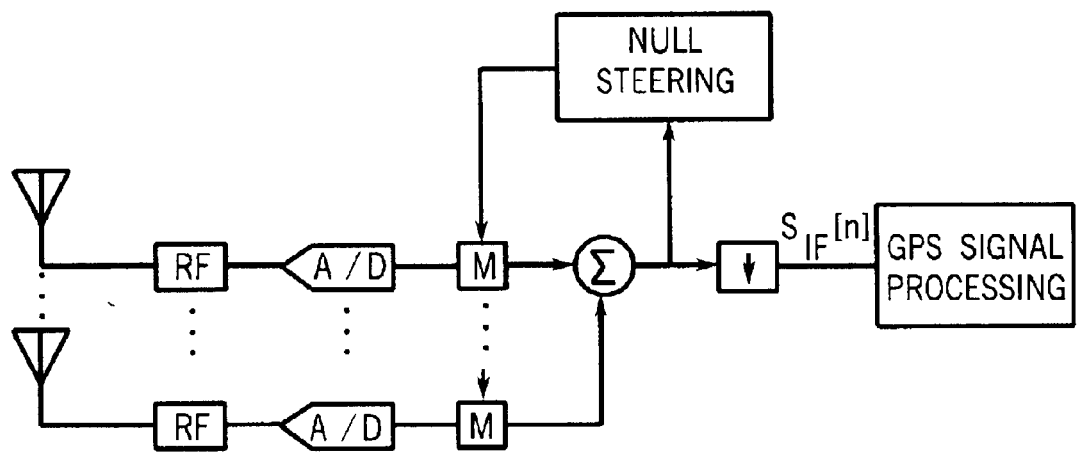
FIG. 2 is a block diagram of a conventional GPS system having null-steering antenna for a non-rotating vehicle.
Figure 3:
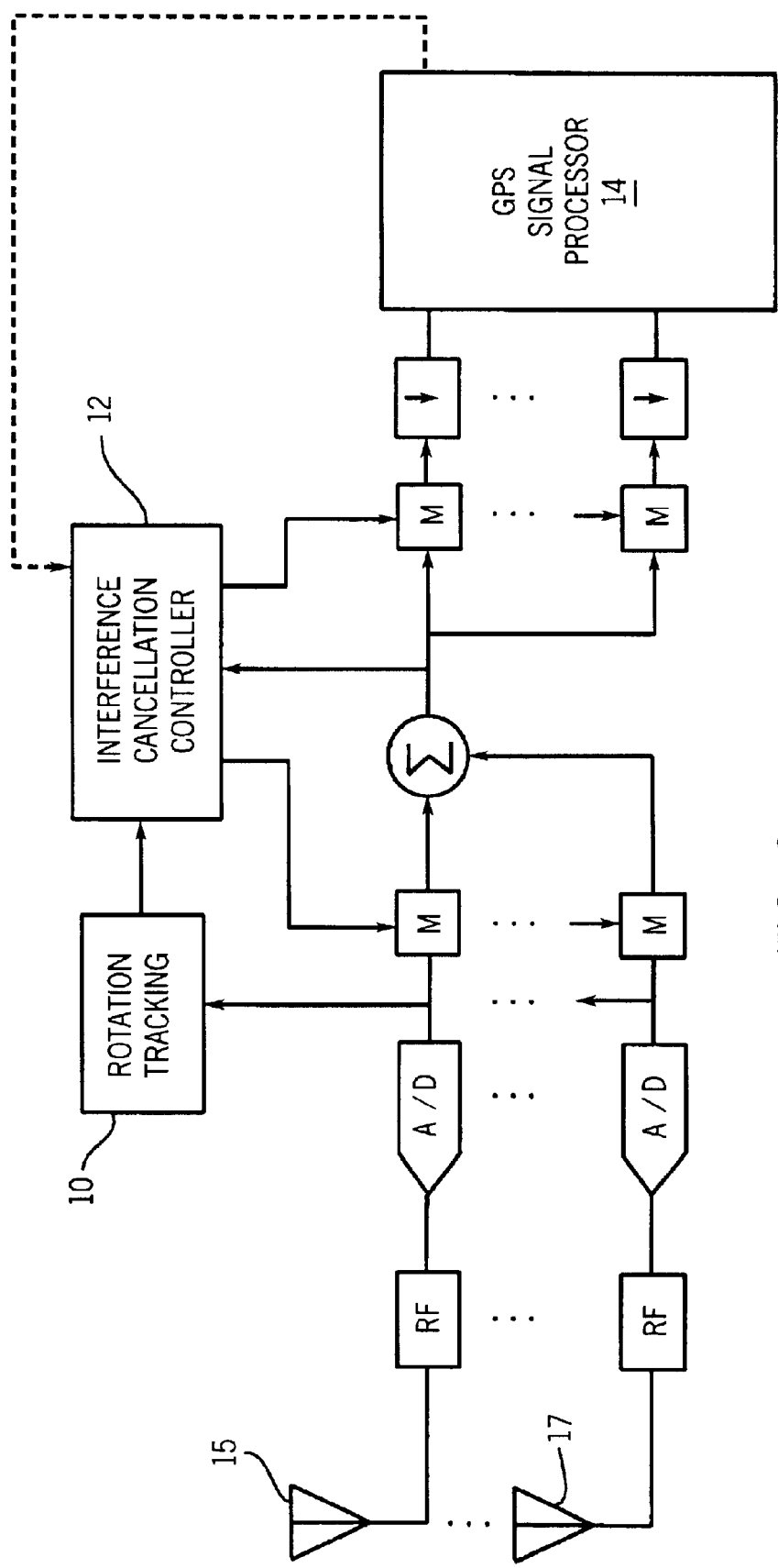
FIG. 3 is a block diagram of an interference-aided signal acquisition and tracking system in accordance with an exemplary embodiment.

Various exemplary embodiments of an interference-aided signal acquisition and tracking system are described with reference to the Figures. FIG. 3 illustrates a digital exemplary embodiment including an interference-aided rotation-tracker 10 that drives a null-steering and phase-shift-correcting, interference-cancellation controller 12. The controller 12 applies modulations to null an interference signal as a function of rotation estimate $\hat{\Omega}$. Further, the controller 12 corrects the phase of an output signal from receivers 15 and 17 for rotation effects and optimizes the amplitude gain in the direction of the satellite. The modulations of the output signal from receivers 15 and 17 may be performed on a per-satellite or per-region-of-sky basis depending on the number of GPS signal processing inputs available. If the modulation is performed on a per satellite basis, the interference cancellation controller 12 corrects the phase of each satellite being tracked based on satellite geometry information from a GPS signal processor 14.

If the modulation of the output signal is based on a region of sky, the interference cancellation controller 12 provides approximate phase corrections for a number of roll angles and the GPS signal processor 14 selects the input most appropriate for each satellite. The act of optimizing data for a satellite or region of the sky is known as beam forming because it effectively forms a synthetic beam or directional antenna in the direction of the desired satellites. Some GPS signal processing systems feature multiple inputs to accommodate several beam-formed inputs. The GPS signal processor 14 selects data from the proper "beam" input for each satellite it tracks and generates satellite geometry information based on the data it receives.

Figure 4:
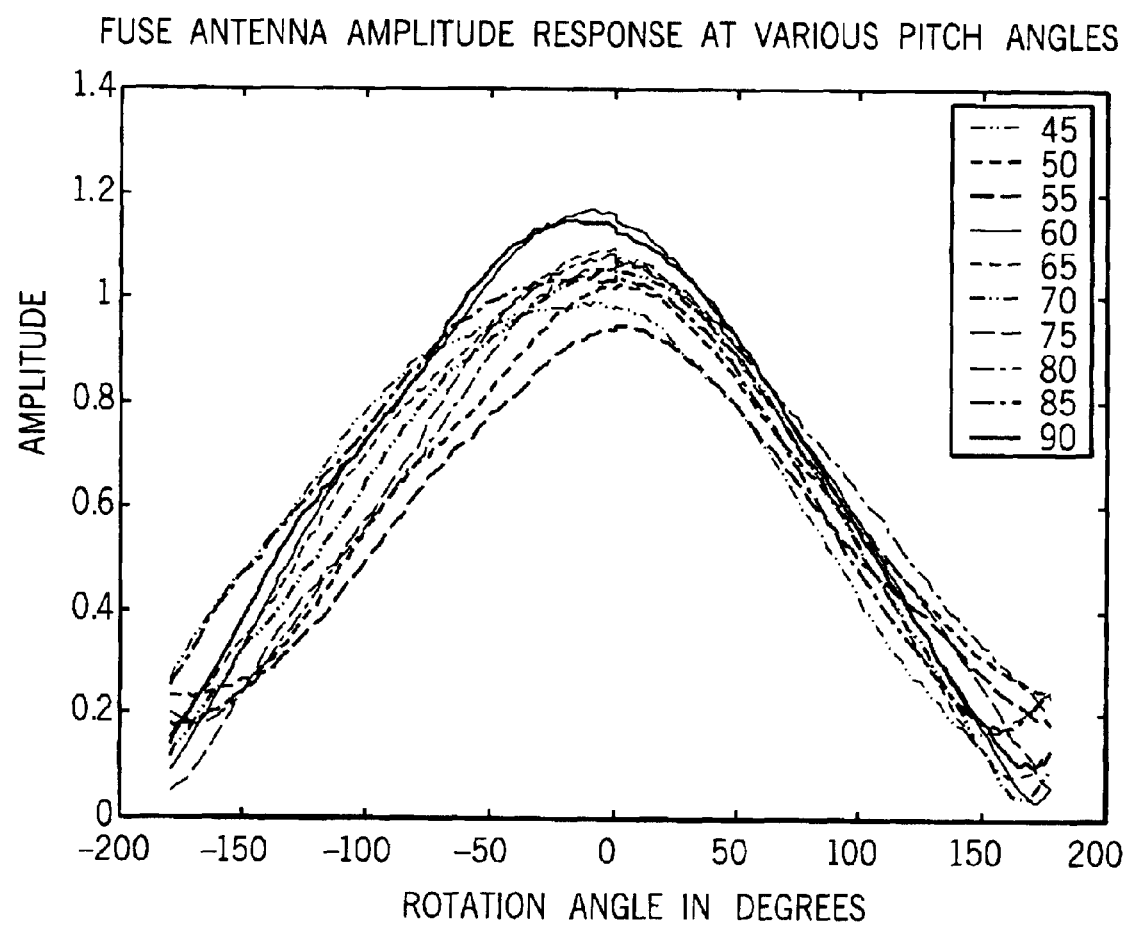
FIG. 4 is a graph depicting amplitude versus rotational angle for various pitch angles (0° pitch is along roll axis) for an exemplary fuse antenna.

FIG. 4 shows the amplitude modulation for GPS frequencies as received by a patch antenna mounted on a cone representative of the size of a artillery fuse configured for use on a missile. The graphs show that a significant amplitude modulation versus roll angle exists and that the modulation is present for a wide range of pitch angles.

Figure 5:
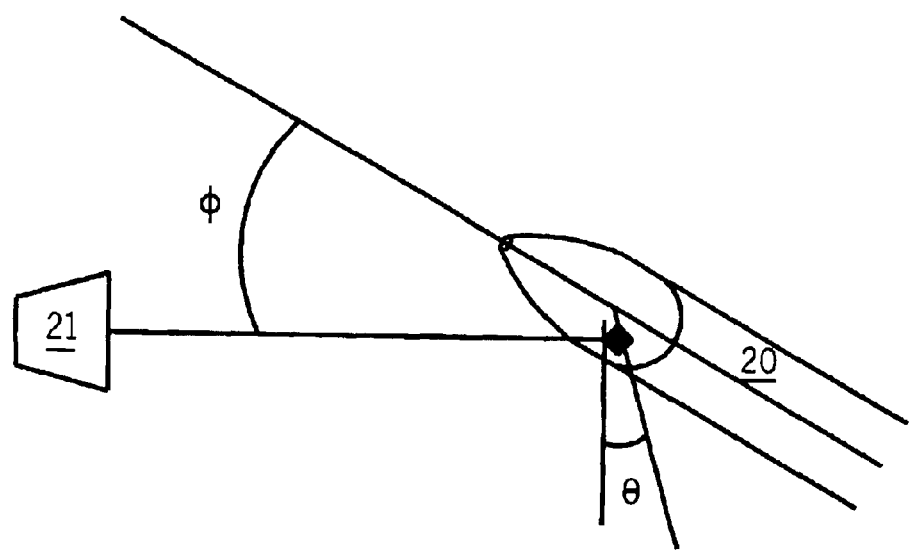
FIG. 5 is a graphical depiction of roll angle θ and pitch angle φ definitions for the system depicted in the graph of FIG. 4.

FIG. 5 shows how the pitch angle ($\phi$) and roll angle ($\theta$) are defined in relation to an artillery shell 20. As the vehicle rotates, any signal received from a jamming or interference source 21 (not on the axis of rotation) is modulated significantly. Any interference source of concern has a large amplitude and is much greater in magnitude than GPS signals or general background noise. The modulation of the total received signal is dominated by the largest interference source. Therefore, the modulation of the total received signal can be utilized to determine both the rotation rate as well as the relative direction of the jamming source 21.

An interference-aided navigation with cyclic jammer cancellation system can be embodied in several forms. Implementations may be analog or digital or a combination of analog and digital. The implementation chosen is dependent on the requirements of the application, such as the level of performance required and the hardware complexity and cost that can be tolerated.

Figure 6:
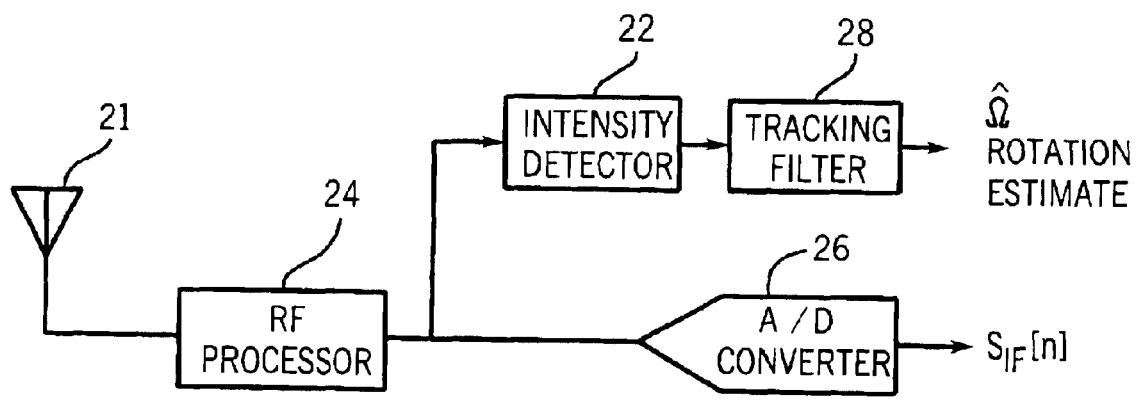
FIG. 6 is a block diagram of a tracking filter implementation with analog intensity detector in accordance with another exemplary embodiment.
Figure 7:
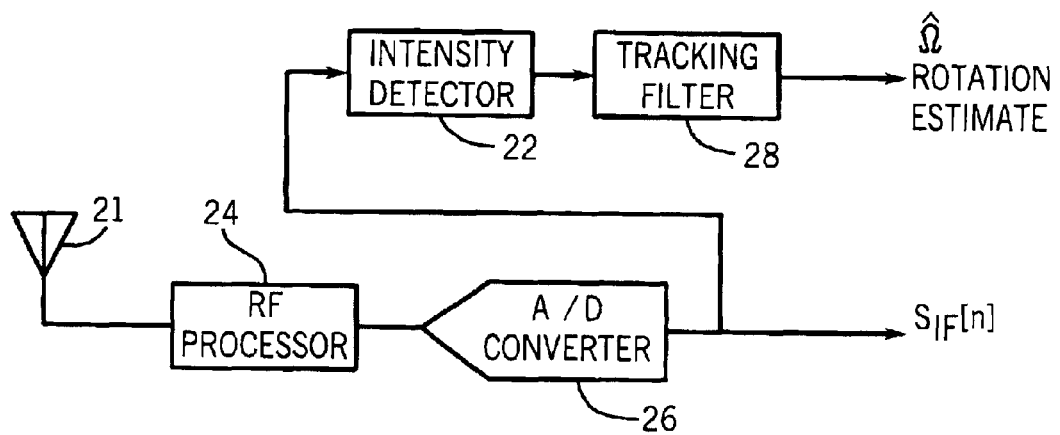
FIG. 7 is a block diagram of a digital tracking filter implementation in accordance with yet another exemplary embodiment.

FIG. 6 shows an implementation of the interference-tracking filter 10 (described with reference to FIG. 3) utilizing a separate analog intensity detector 22. The intensity detector 22 measures the analog output of a RF signal processor 24 coupled to a receiver 21 and outputs a measure of the signal intensity (or amplitude) as an analog or digital signal to detector 22. Preferably, the signals from the RF processor 24 are digitized with a wide-dynamic-range A/D converter 26. The signal gains from the RF processor 24 and the A/D converter 26 typically do not change because the individual A/D outputs are combined. If the gains are modulated as a function of rotation, the changes must be accurately known by the signal processor 14 (FIG. 3). The A/D digitized outputs may, therefore, be utilized for the intensity detector 22 as shown in FIG. 7. Advantageously, this digital implementation allows the intensity detector 22, tracking filter 28 and interference cancellation controller 12 (FIG. 3) to be combined into a single signal processing function.

Figure 8:
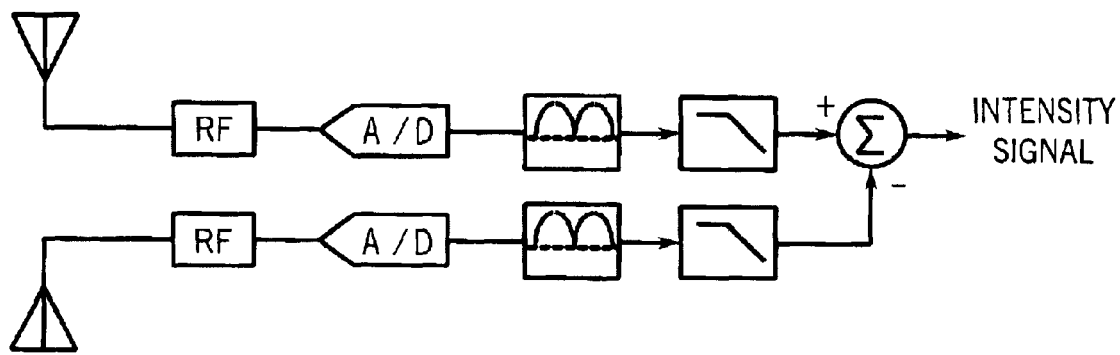
FIG. 8 is a block diagram of a two-antenna example of intensity detector in accordance with yet another exemplary embodiment.

The intensity detector 22 may utilize a single A/D output or a combination of the outputs. For example, FIG. 8 shows an intensity detector on a two-antenna (receiver) system (in which the two antennas are on opposite sides of a vehicle and generally have opposite intensity modulations) that takes the difference of the filtered magnitudes of two antennas to form an intensity signal strongly dependent on rotation.

Figure 9:
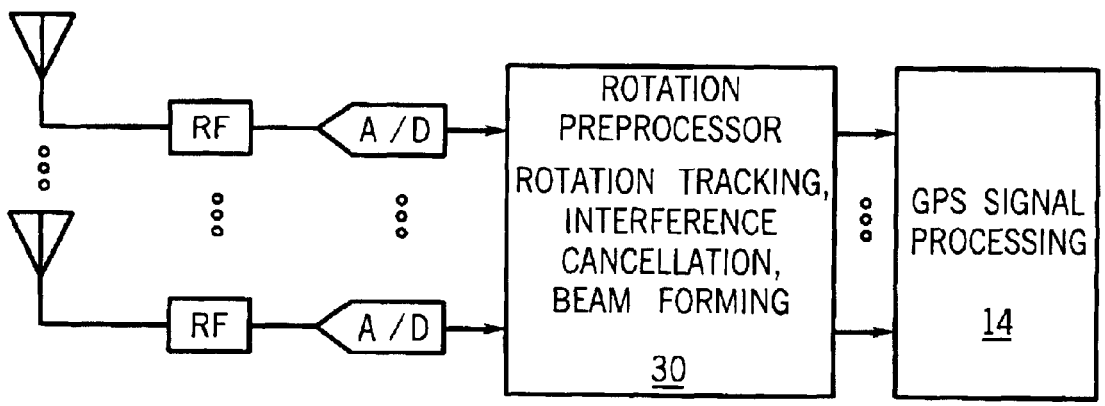
FIG. 9 is a block diagram of a digital implementation of an exemplary embodiment.

FIG. 9 illustrates a block diagram showing how the rotation tracking, interference cancellation, and beam forming functions may all be combined into a single rotation preprocessor digital signal processing block 30. The rotation preprocessor 30 may be implemented as an ASIC (application specific integrated circuit), FPGA (field-programmable gate array), or very-high-speed general-purpose digital signal processor, or combination of general processor and application specific logic (such as an FPGA or ASIC combined with a general-purpose processor).

The implementation of the tracking filter is dependent on the target application. Performance requirements, hardware complexity limitations, as well as issues of compatibility with existing GPS receiver hardware, all influence the design. For applications in which the rotation rate is known within a very limited range, the tracking filter may be a simple band-pass filter and comparator. For improved performance and greater dynamic range, a phase locked loop, tracking demodulator, or even advanced FFT frequency estimation techniques may be utilized. For enhanced performance under conditions of intermittent interference or high dynamics, inertial data may be used to aid the tracking filter.

Figure 10:
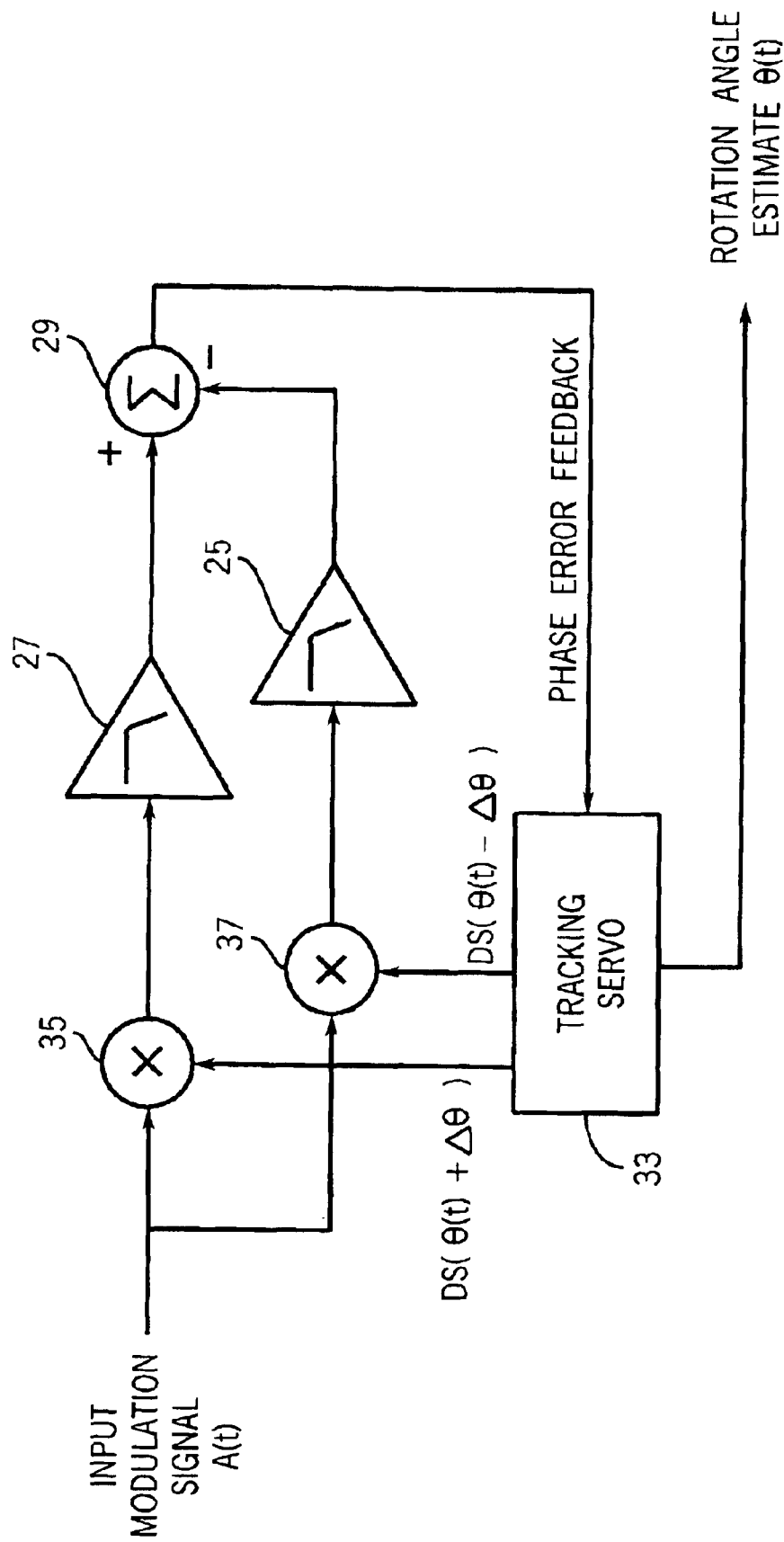
FIG. 10 is a block diagram of a tracking filter implementation in accordance with an exemplary embodiment.

FIG. 10 illustrates a closed-loop tracking filter implementation. A tracking servo 33 maintains an estimate of the rotation angle (relative to the interference source) $\theta(t)$ using phase error feedback from a summer 29 and amplifiers and/or filters 25 and 27. The total modulated amplitude signal A(t) is mixed with an advanced and delayed demodulation signals ($DS(\theta(t)+\Delta\theta)$ and $DS(\theta(t)-\Delta\theta)$) using mixers 35 and 37. The demodulation signal (DS) is generally a simplified model of the modulation function in relation to angle. One way to implement the demodulation signal is a simple on/off function.

If the two demodulation stages are replaced with a single demodulator with a new demodulation signal:

$$DS'(\theta(t))=DS(\theta(t)+\Delta\theta)-DS(\theta(t)-\Delta\theta)$$

Figure 11:
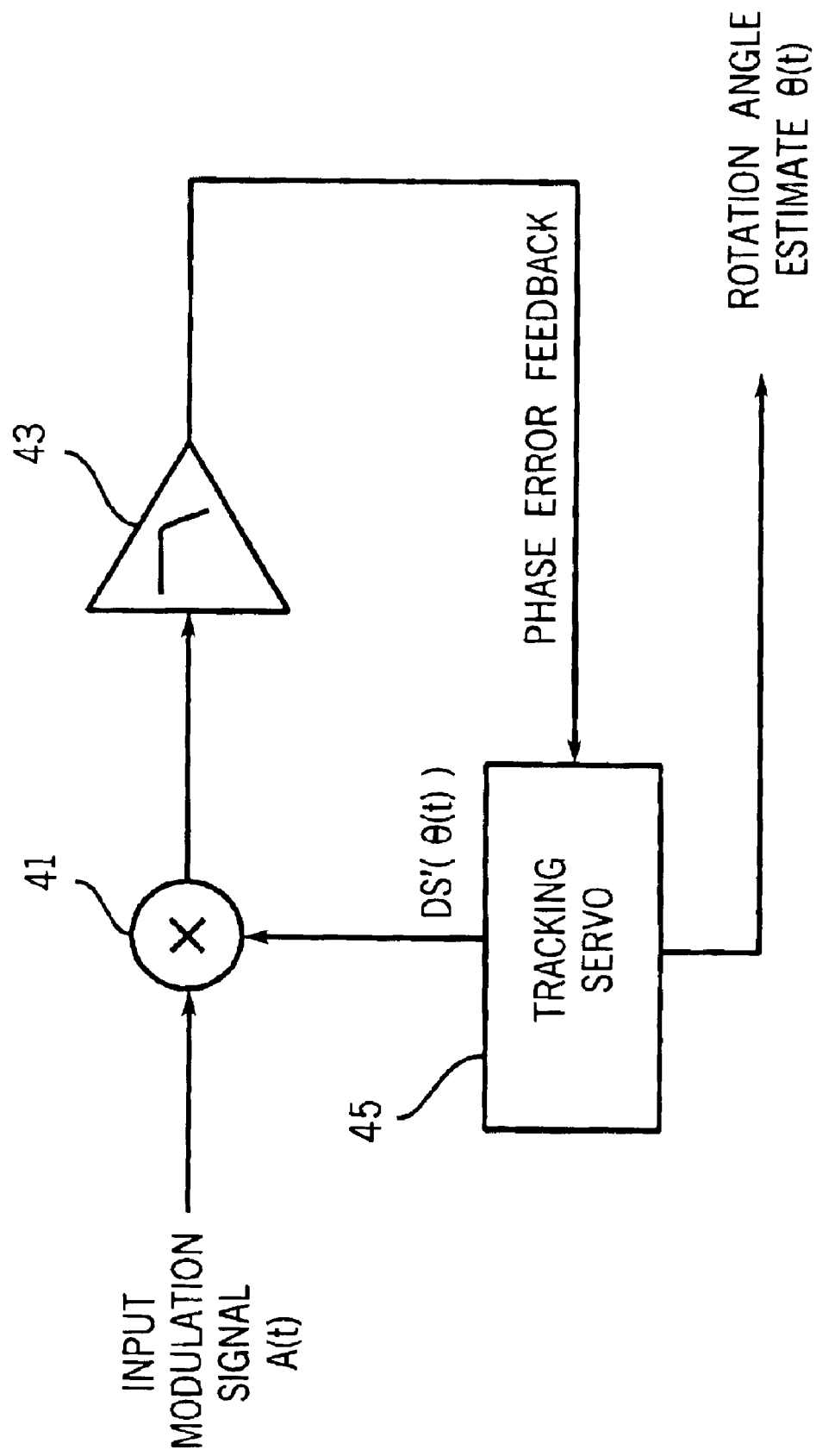
FIG. 11 is a block diagram of a tracking filter implementation in accordance with an exemplary embodiment.

$DS'(\theta(t))$ can be implemented by a simple +/−1 gain switch, or a more complex waveform to optimize performance. FIG. 11 shows the more simplified implementation of the tracking filter of FIG. 10 including a single mixer 41, an amplifier and/or filter 43, and a tracking servo 45.

The tracking servo dynamics are a function of the application's expected motion and the expected interference. In one embodiment, an integrator feedback or PID (proportional, integral derivative) control is adequate once the servo is "locked on" to the modulation signal. The term "locked on" refers to the condition in which the tracking servo frequency estimate and the actual modulation frequency are close enough that the tracking servo feedback can correct the errors and keep the rotation estimate tracking the changes in the actual rotation rate. Initially, there may be a large error in the rotation rate estimate making it difficult for the tracking servo to lock on. A separate acquisition mode may be required in the tracking servo to acquire an initial estimate of the rotation rate. One rapid-acquisition technique is to measure the frequency of the modulation of the phase error feedback signal with the rotation rate estimate set at a fixed value. The frequency of the phase error signal is directly related to the error in the rotation rate estimate.

Figure 12:
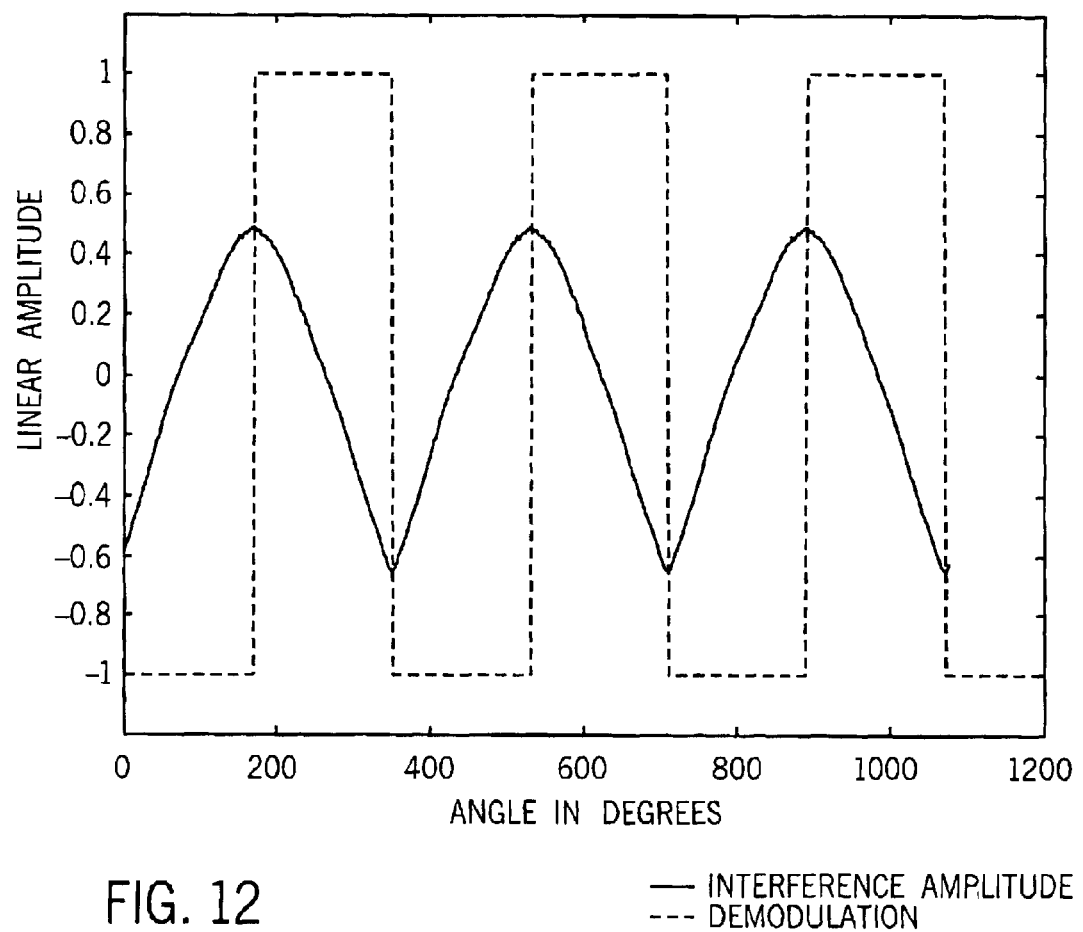
FIG. 12 is a graph depicting an AC-Coupled interference amplitude and square wave demodulation function.
Figure 13:
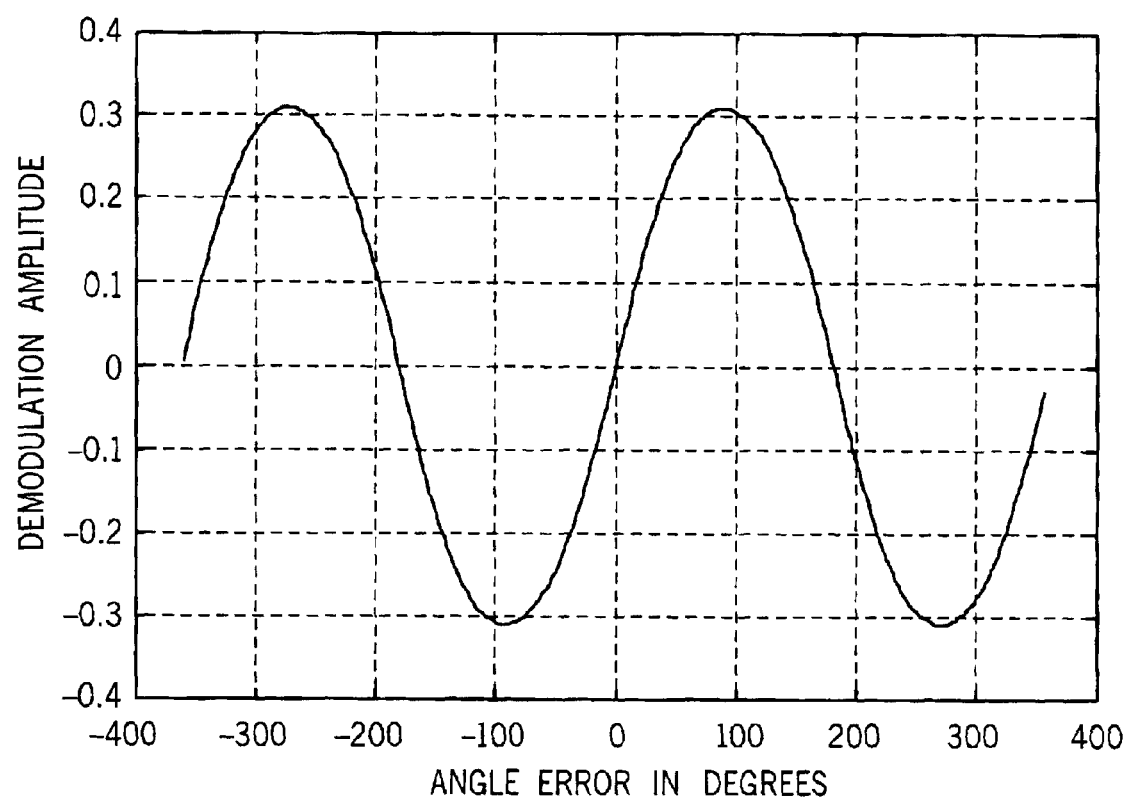
FIG. 13 is a graph depicting an output of demodulation filter with square wave demodulation signal.

FIG. 12 shows an example square wave demodulation signal aligned with the modulation of the interference amplitude. FIG. 13 shows how the average of the product of the demodulation and interference amplitude signals (the filtered demodulator phase error feedback signal) changes in relation to their relative alignments. The error signal goes through one cycle for every 360° of relative phase shift. The frequency of the phase error feedback signal is equal to the difference between the actual and estimated rotation frequencies.

The interference cancellation controller 12 (FIG. 3) may be implemented in a number of ways depending on the performance requirements and acceptable level of cost and complexity of the application as well as the expected interference environment. The general goal of the interference cancellation controller 12 is to provide modulation commands to the input and output modulators to cause a significant reduction in the interference signal while still maintaining adequate strength and integrity of the desired navigation signal. Generally these modulation commands are functions to the estimated rotation angle $\hat{\theta}$ produced by the tracking filter 28 (e.g., FIG. 6).

The modulation commands may also be a function of additional parameters estimated by the interference cancellation controller 12, such as pitch angle to the interference and/or navigation source, roll angle between interference and navigation source, roll-angle offset of the interference source, or other performance optimizing parameters, such as antenna phase or amplitude errors. Generally, these parameters are much more slowly varying than the rotation rate, and they are estimated using feedback signals from the input modulation summer or the GPS signal processor 14 (FIG. 3).

Figure 14:
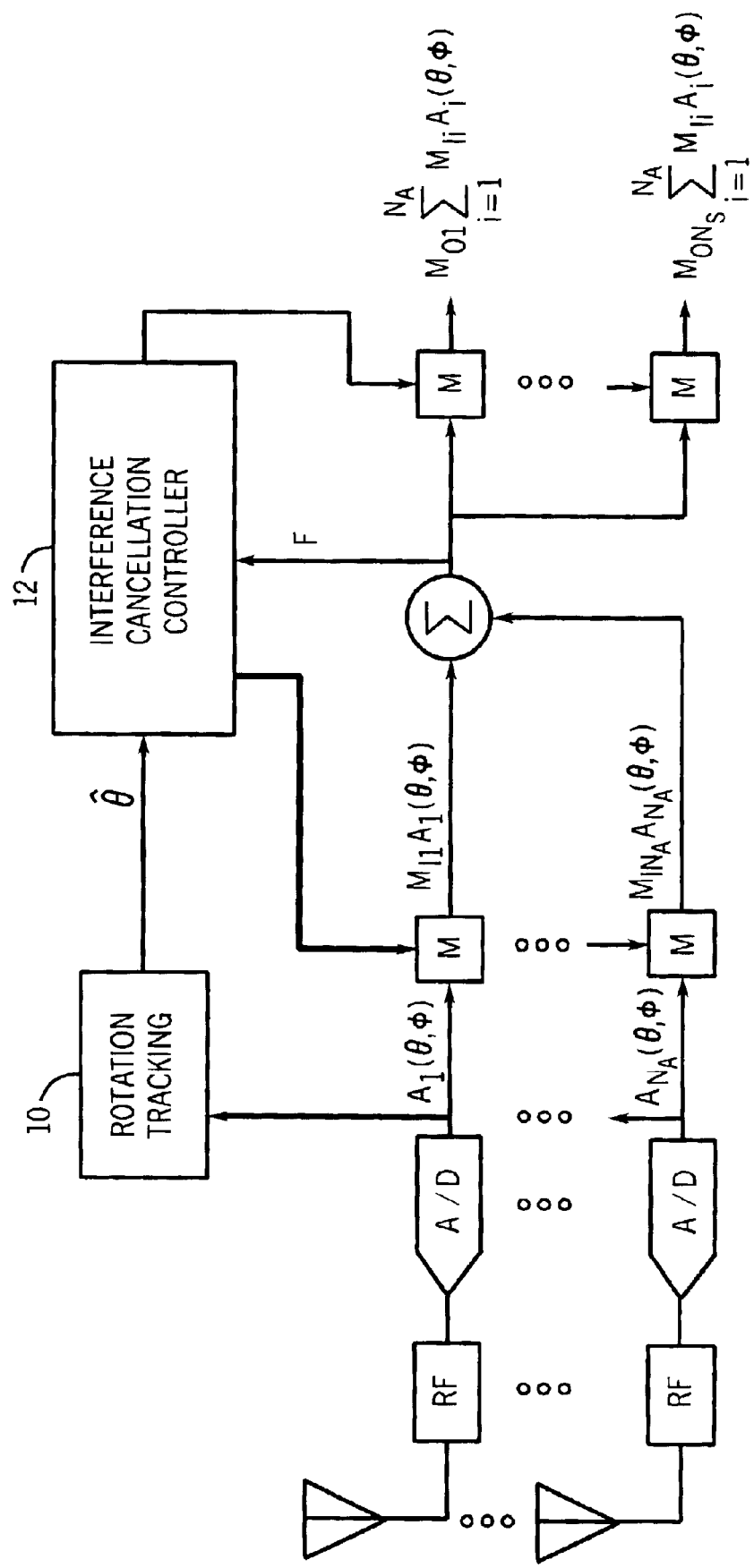
FIG. 14 is a diagrammatic representation of interference cancellation control modulation signals in accordance with an exemplary embodiment.

FIG. 14 shows an example of how the modulation commands from the interference cancellation controller 12 affect the received signals. The phase and amplitude modulation of the digitized signals from antenna 1 through $N_A$ are defined as:

$A_1(\theta,\phi)$ through $A_{N_A}(\theta,\phi)$

These are a function of the actual roll and pitch angles $(\theta,\phi)$ to a signal source. These signals are phase and amplitude modulated by functions controlled by the interference cancellation controller 12 to form signals:

$M_{I1}A_1(\theta,\phi)$ through $M_{IN_A}A_{N_A}(\theta,\phi)$

The modulation commands are functions of the estimated roll and pitch angles to both the signal and interference sources which are generally controlled to be approximately equal to the actual roll and pitch angles.

These modulated signals are summed to form a feedback signal:

$$F = \sum_{i=1}^{N_A} M_{Ii} A_i(\theta, \phi)$$

The feedback signal is a function of the roll angle and the errors in the roll and pitch estimates. The feedback signal generally has significantly reduced interference component and is utilized for both feedback to the interference cancellation controller 12 as well as the signal source for the output modulators.

$M_{O1}$ through $M_{ON_S}$ where $N_S$ is the number of inputs to the GPS signal processor 14.

The output modulators correct the phase and amplitude for both antenna motion and residual modulation due to the noise cancellation. The corrected signal is fed into the various channels of the GPS signal processor 14 to form GPS signals:

$$M_{O1} \sum_{i=1}^{M} M_{Ii}A_i(\theta, \phi) \text{ through } M_{ON_S} \sum_{i=1}^{M} M_{Ii}A_i(\theta, \phi)$$

Each of these output signals may be decimated and/or sub-sampled before being fed into the GPS signal processor 14.

There are many techniques available to minimize interference and optimize desired signal characteristics using multi-element antenna arrays. To apply these techniques to a spinning vehicle, a solution set of modulations ($M_{I1}$ through $N_{IN_A}$) and $N_{O1}$ through $N_{ONS}$) should be found at a number of roll angles $\theta_i$. The interference cancellation controller 12 may then apply the proper modulation set based on the roll angle estimate $\hat{\theta}$. The number of discrete roll angle steps utilized and the technique chosen to interpolate between these steps is application dependent and is based on the performance requirements and restraints on cost, complexity, and processing power available.

There are a number of implementation alternatives for the interference cancellation controller 12. One technique is to predetermine the modulation commands as functions of roll and possibly pitch angles using design information and/or antenna measurements made during manufacture. The modulation commands are calculated a priori and programmed into the interference cancellation controller 12 as a lookup table or set of functions. A variation on this approach is to form a nominal set of modulation commands but to allow additional parameters such as antenna phase and amplitude corrections to be adjusted during operation to optimize performance. For example, one could characterize the nominal antenna characteristics and develop a linearized model for the optimal modulation commands based on estimate of these parameters. This technique would allow small changes in certain characteristics to be compensated for during operation.

In an alternative embodiment, an interference reduction calculation can be performed in the interference cancellation controller 12. Controller 12 computes a set of modulation commands by sampling the signals at a set of given angles and over multiple revolutions determining the best set of modulation commands at each angle.

The implementations for control and modulation commands can be selected based upon hardware complexity limitations and on the expected dynamics of the vehicle and interference source. A priori pre-calculation of the commands works well in high-dynamic environments in which vehicle or interference source geometry changes do not allow time for refinement of the command set. Under conditions of more moderate dynamics, the modulation commands can be more fully refined over time for best performance.

An exemplary embodiment of an interference-aided signal acquisition and tracking system is a two-antenna (or receiver) system with four inputs into the GPS signal processor 14. This system can provide good interference rejection to a single jamming source and provides adequate output diversity to facilitate tracking of satellites in multiple directions. The two-antenna example also has simple algebraic solutions to the modulation commands to permit better illustration of the principles involved.

Figure 15:
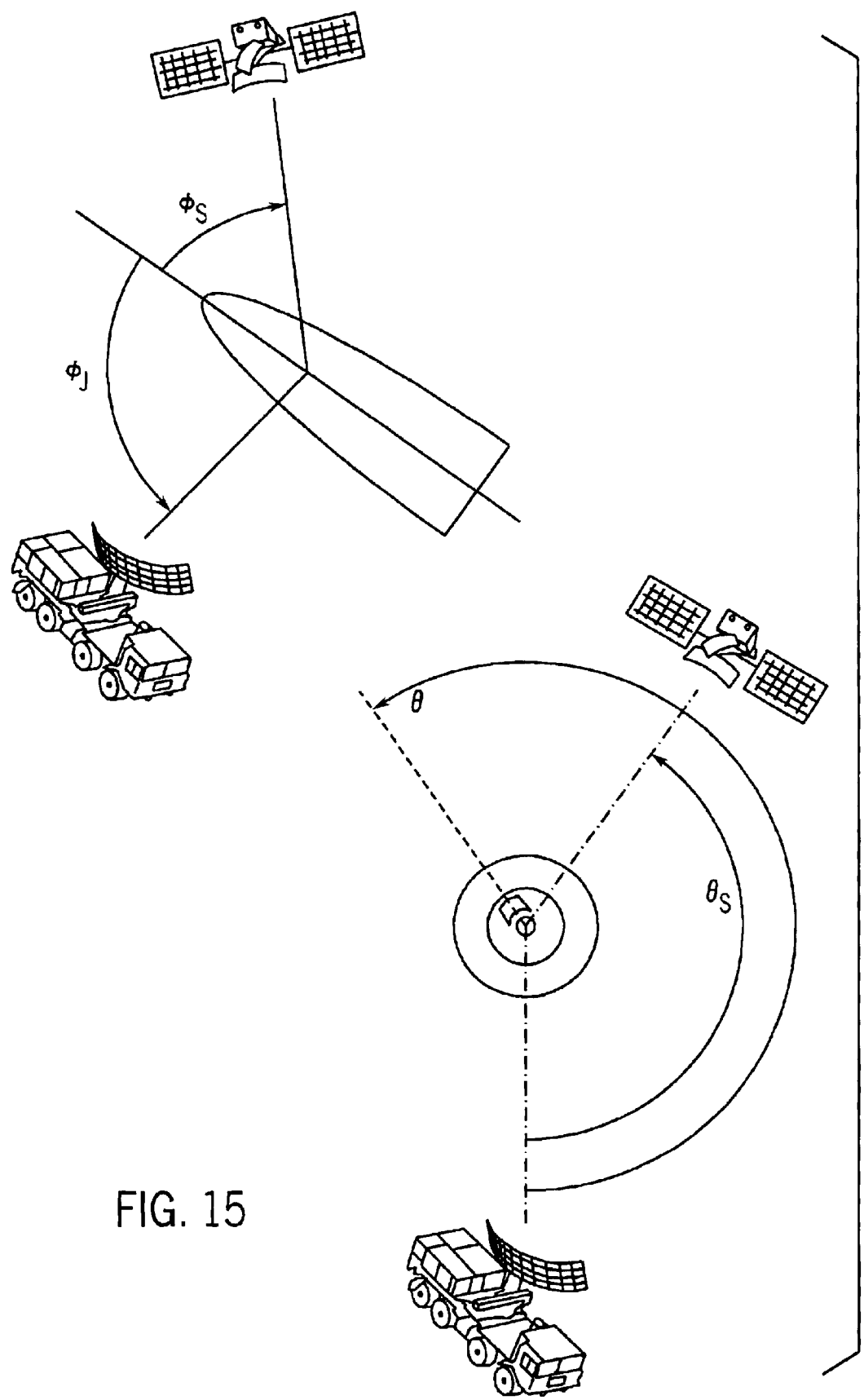
FIG. 15 is a diagrammatic representation of pitch and roll angle definitions for an exemplary jamming source and satellite signal.

FIG. 15 shows the angle definitions for the vehicle roll angle $\theta$ and the signal roll angle $\theta_S$ relative to the jamming source. The roll angle of the jammer $\theta_J$ is set at zero for simplicity. For a jammer at a pitch angle $\phi_J$ and signal pitch $\phi_S$ relative to the vehicle rotation axis the amplitude and phase modulation of the jamming signal received from antennas 1 and 2 is given by:

$A_1(\theta,\phi_J)$ and $A_2(\theta,\phi_J)$ and the amplitude and phase modulation of the desired signal received by antennas 1 and 2 is given by:

$A_1(\theta-\theta_S,\phi_S)$ and $A_2(\theta-\theta_S,\phi_S)$

An amplitude and phase modulation $M_i$ can be applied to each of the antenna output signals to minimize the jamming signal and pass the desired signal. The modulated jamming signal amplitude and phase is given by $J(\theta)$:

$$J(\theta)=M_1 A_1(\theta,\phi_J)+M_2 A_2(\theta,\phi_J)$$

and the desired signal amplitude and phase modulation is given by $S(\theta)$:

$$S(\theta)=M_1 A_1(\theta-\theta_S,\phi_S)+M_2 A_2(\theta-\theta_S,\phi_S)$$

The modulation functions that set $J(\theta)$ to zero and $S(\theta)$ to 1 can be solved.

$$M_1 = \frac{-A_2(\theta,\phi_J)}{A_1(\theta,\phi_J)A_2(\theta-\theta_S,\phi_S) - A_2(\theta,\phi_J)A_1(\theta-\theta_S,\phi_S)} \equiv m_1(\theta,\phi_J,\theta_S,\phi_S)$$

$$M_2 = \frac{A_1(\theta,\phi_J)}{A_1(\theta,\phi_J)A_2(\theta-\theta_S,\phi_S) - A_2(\theta,\phi_J)A_1(\theta-\theta_S,\phi_S)} \equiv m_2(\theta,\phi_J,\theta_S,\phi_S)$$

The modulation functions are dependent on vehicle roll angle, jammer pitch angle, and the roll and pitch angle of the signal source.

Figure 16:
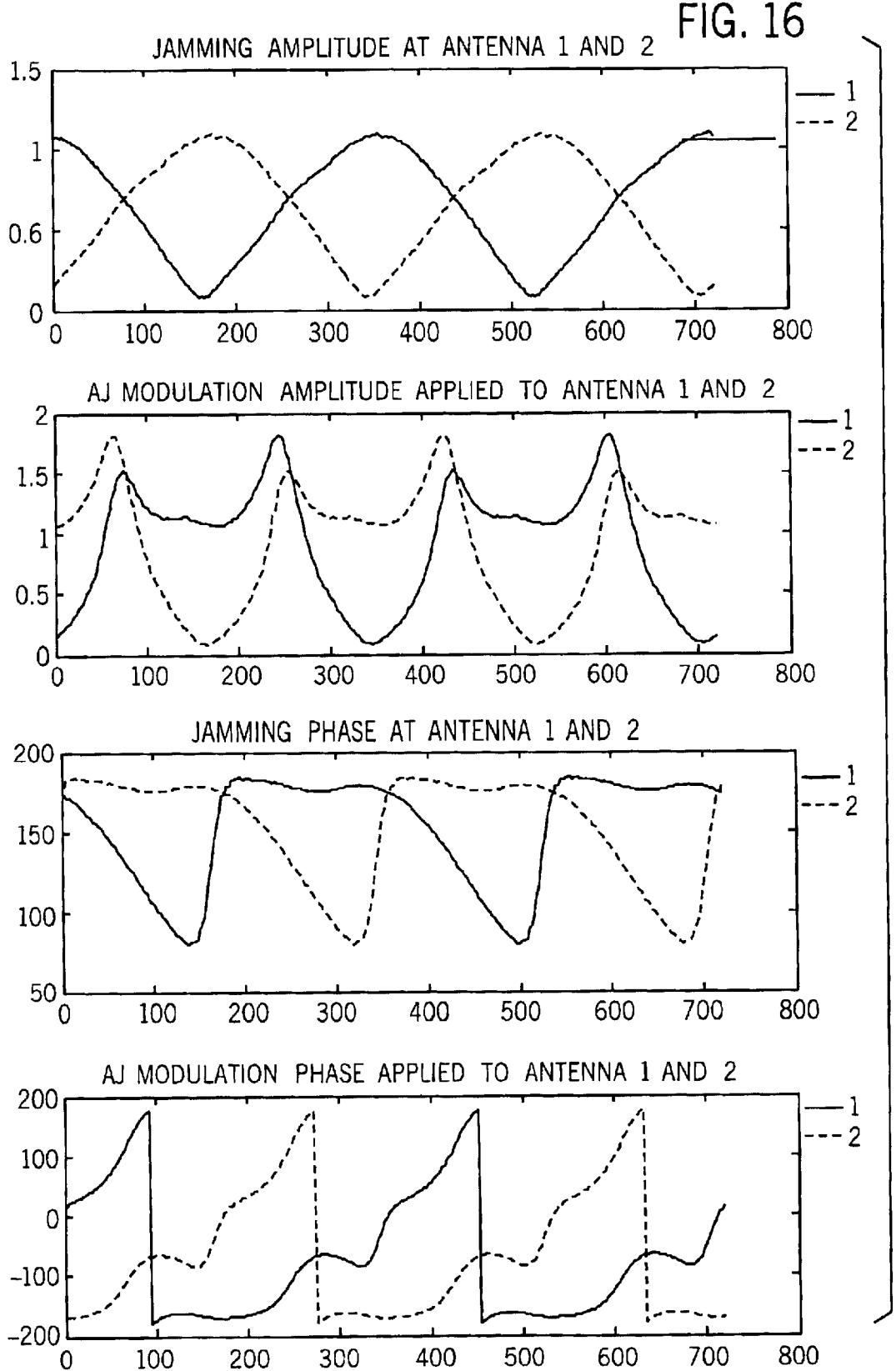
FIG. 16 are graphs depicting simulation results showing jamming amplitudes and phases (top) and modulation amplitudes and phases (bottom)

FIG. 16 shows graphs depicting simulated jamming signal amplitudes and phases (top two plots) and the corresponding modulation amplitudes and phases (bottom two plots) that minimize the jammer and keeps a single from a source with pitch of 90° and roll angle of 180° (opposite the jamming source). Given the pitch and roll values for the jammer and the desired signal source, a pair of complex modulation values may be determined.

Figure 17:
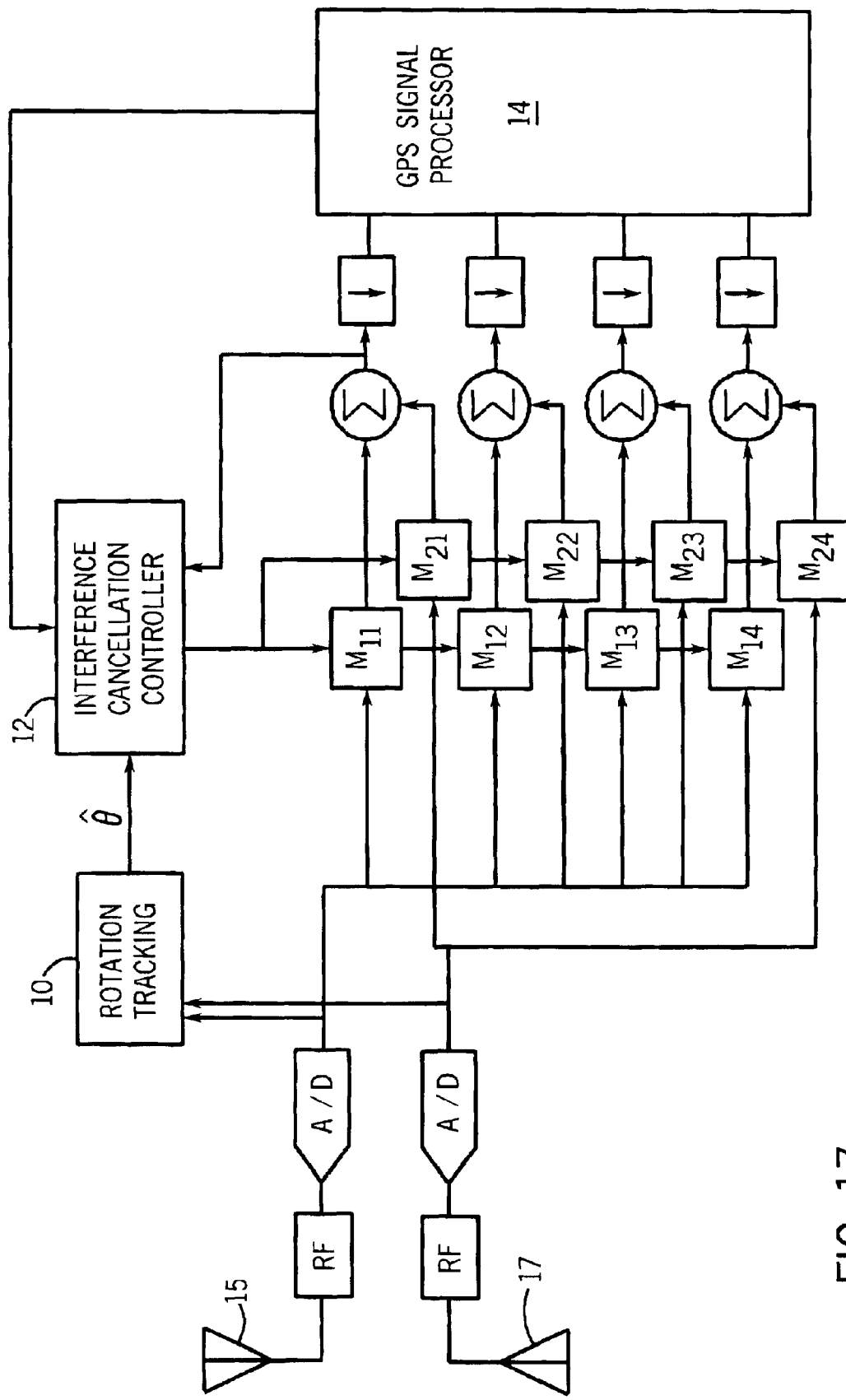
FIG. 17 is a diagrammatic representation of an exemplary direct CJC implementation with eight modulators.

In an exemplary embodiment, where there are four inputs to the GPS signal processor 14, the modulation can be set to be zero phase and unity gain in four different signal directions $(\theta_{S1},\phi_{S1})$, $(\theta_{S2},\phi_{S2})$, $(\theta_{S3},\phi_{S3})$ and $(\theta_{S4},\phi_{S4})$. This gives a total of eight modulators with modulation functions given by:

$M_{11}=m_1(\theta,\phi_J,\theta_{S1},\phi_{S1})$  $M_{21}=m_2(\theta,\phi_J,\theta_{S1},\phi_{S1})$ $M_{12}=m_1(\theta,\phi_J,\theta_{S2},\phi_{S2})$  $M_{22}=m_2(\theta,\phi_J,\theta_{S2},\phi_{S2})$ $M_{13}=m_1(\theta,\phi_J,\theta_{S3},\phi_{S3})$  $M_{23}=m_2(\theta,\phi_J,\theta_{S3},\phi_{S3})$ $M_{14}=m_1(\theta,\phi_J,\theta_{S4},\phi_{S4})$  $M_{24}=m_2(\theta,\phi_J,\theta_{S4},\phi_{S4})$ FIG. 17 shows Cyclic Jammer Cancellation (CJC) implemented directly utilizing eight phase modulators. Signal sources that are close to the four selected directions have zero phase shift and unity gain throughout a rotation. The direct implementation of the Cyclic Jammer Cancellation is practical when there are a small number of antenna and GPS signal processing inputs. However, as the number of antennas and inputs to the GPS signal processor 14 grows, the number of modulators grows as the product of the two.

Figure 18:
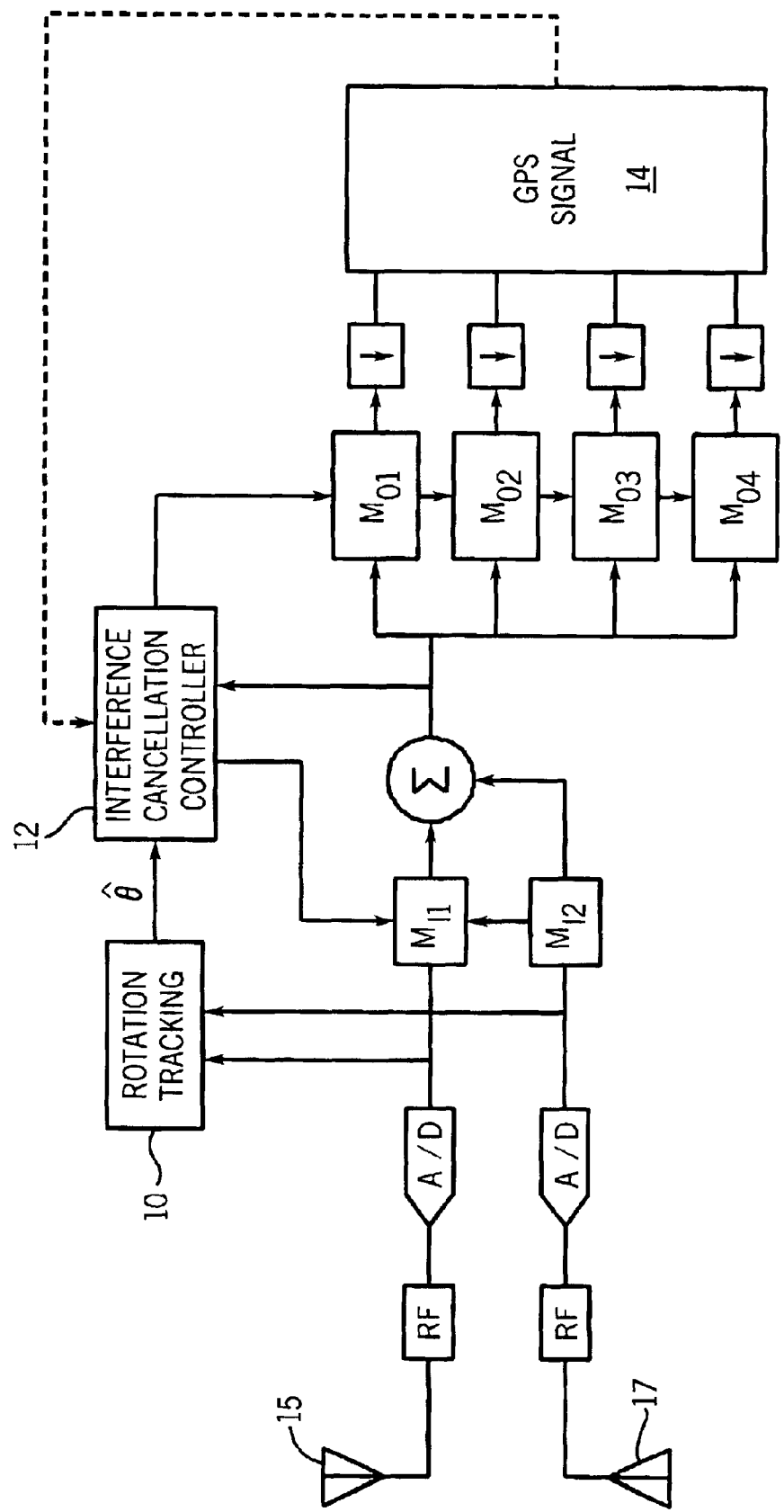
FIG. 18 is a diagrammatic representation of an exemplary CJC implementation with a reduced number of phase modulators.

A CJC architecture is shown in FIG. 18 that has fewer modulators. The number of modulators in this architecture grows only as the sum of the number of antennas and inputs to the GPS signal processor 14. The reduced modulator architecture utilizes one set of modulators before the summation state to remove the jamming signal and an additional modulator for each signal processing input to correct the residual phase and amplitude modulation for the signals from a selected direction.

The input modulators may be implemented by selecting a modulation to minimize the jamming signal and maintain unity gain and zero phase shift in an arbitrary direction $(\theta_{SO},\phi_{SO})$ The input modulation functions are then given by:

$M_{I1}=m_1(\theta,\phi_J,\theta_{SO},\phi_{SO})$  $M_{I2}=m_2(\theta,\phi_J,\theta_{SO},\phi_{SO})$ which produces a residual modulation for a signal in a direction $(\theta_{Si},\phi_{Si})$ of:

$S_i=M_{I1}A_1(\theta-\theta_{Si},\phi_{Si})+M_{I2}A_2(\theta-\theta_{Si},\phi_{Si})$ To correct for this residual modulation, output modulation functions can be applied:

$$|M_{Oi}| \equiv \frac{1}{|S_i|} \quad \angle M_{Oi} \equiv \angle S_i$$

Figure 19:
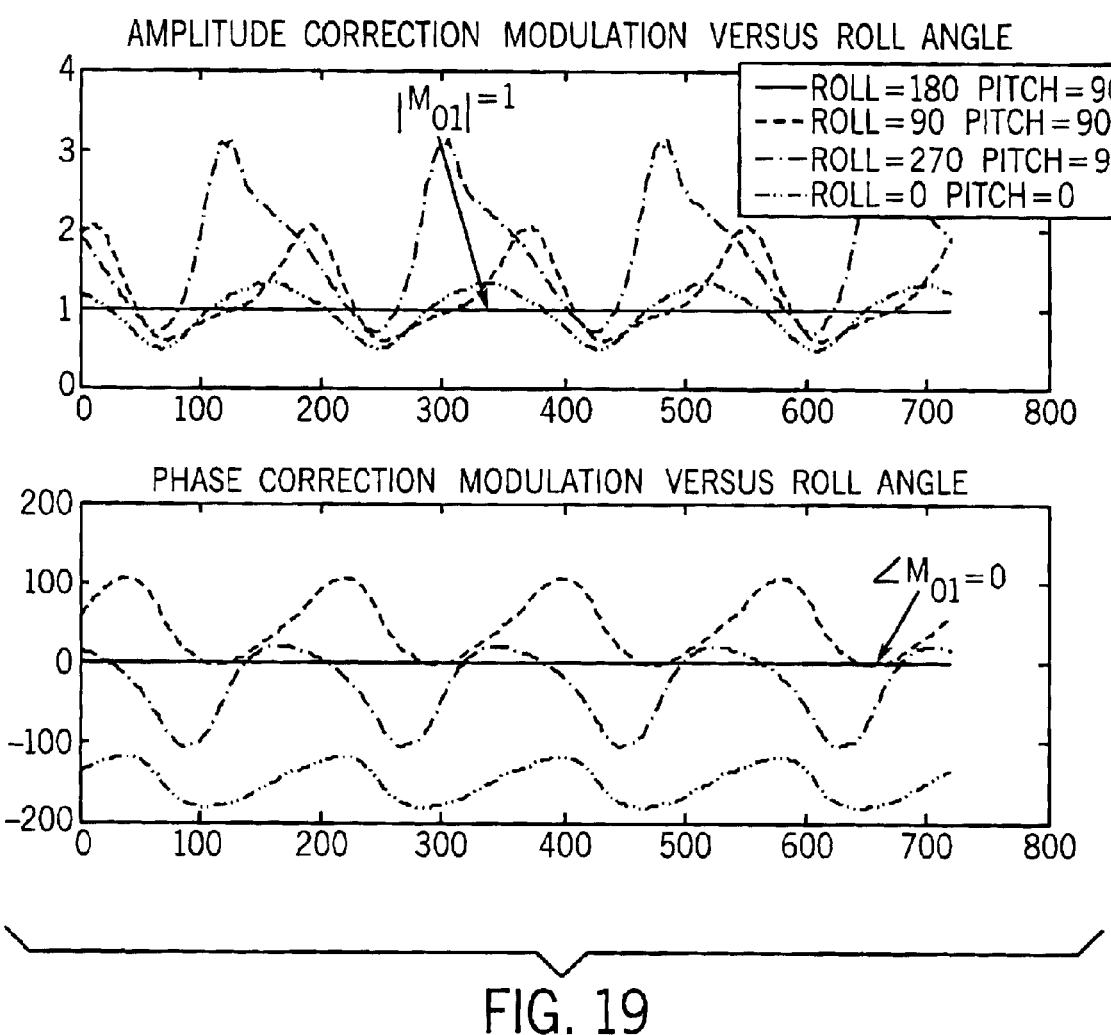
FIG. 19 are graphs depicting output modulation amplitudes and phases for various signal pitch and roll angles.

FIG. 19 shows an example of the output modulation signals that may be applied to correct the amplitude and phase modulation in four directions. Note that $(\theta_{SO},\phi_{SO})=(\theta_{S1},\phi_{S1})$ were selected so that no $M_{O1}$ modulator is required. If the output modulation functions are not well behaved for this choice (i.e., $|S_i|\to 0$ causing $|M_{Oi}|\to\infty$ to at some angles), then an alternate choice of $(\theta_{SO},\phi_{SO})$ may be required and $M_{O1}$ may not be eliminated.

Exemplary embodiments may be extended to any number of antennas and GPS signal processing channels. With more antennas, there are additional degrees of freedom. Instead of just minimizing one jamming source and preserving one signal direction, multiple jamming source directions may be nulled and/or multiple signal directions may be preserved. Some of the added degrees of freedom may also be utilized to mold the signal response to a desired shape.

The response to any $j^{th}$ signal (jamming or desired) from a direction $(\theta_{Sj},\phi_{Sj})$ is given by:

$$s_j(\theta) = \sum_{i=1}^{N_A} M_{Ii}(\theta)A_i(\theta-\theta_{Sj},\phi_{Sj})$$

where $N_A$ is the total number of antennas.

The set of all specified solutions can be written in matrix form:

$$\begin{bmatrix} s_1(\theta) \\ s_2(\theta) \\ \vdots \\ s_{N_S}(\theta) \end{bmatrix} = \begin{bmatrix} A_1(\theta-\theta_{S1},\phi_{S1}) & A_2(\theta-\theta_{S1},\phi_{S1}) & \cdots & A_{N_A}(\theta-\theta_{S1},\phi_{S1}) \\ A_1(\theta-\theta_{S2},\phi_{S2}) & A_2(\theta-\theta_{S2},\phi_{S2}) & & \\ \vdots & & \ddots & \\ A_1(\theta-\theta_{N_S},\phi_{N_S}) & & & A_{N_A}(\theta-\theta_{N_S},\phi_{N_S}) \end{bmatrix} \begin{bmatrix} M_{I1}(\theta) \\ M_{I2}(\theta) \\ \vdots \\ M_{IN_A}(\theta) \end{bmatrix}$$

where $N_S$ is the total number of signals (desired and jamming) that are specified.

This can be written simply as:

$$\vec{s}(\theta) = A(\theta)\vec{m}(\theta)$$

If $N_S = N_A$, the modulation functions $\vec{m}(\theta)$ can be solved with:

$$\vec{m}(\theta) = A^{-1}(\theta)\vec{s}(\theta)$$

If $N_S > N_A$, least-squares techniques can be utilized to find a set of modulation functions that comes closest to the desired signal response.

Note that this matrix form gives the same solution at the two-antenna example above:

$\vec{s}(\theta) = A(\theta)\vec{m}(\theta)$ is:

$$\begin{bmatrix} 0 \\ 1 \end{bmatrix} = \begin{bmatrix} A_1(\theta-\theta_J,\phi_J) & A_2(\theta-\theta_J,\phi_J) \\ A_1(\theta-\theta_S,\phi_S) & A_2(\theta-\theta_S,\phi_S) \end{bmatrix} \begin{bmatrix} M_{I1}(\theta) \\ M_{I2}(\theta) \end{bmatrix}$$

$\vec{m}(\theta) = A^{-1}(\theta)\vec{s}(\theta)$ is:

$$\begin{bmatrix} M_{I1}(\theta) \\ M_{I2}(\theta) \end{bmatrix} = \frac{\begin{bmatrix} A_2(\theta-\theta_S,\phi_S) & -A_2(\theta-\theta_J,\phi_J) \\ -A_1(\theta-\theta_S,\phi_S) & A_1(\theta-\theta_J,\phi_J) \end{bmatrix}}{A_1(\theta-\theta_J,\phi_J)A_2(\theta-\theta_S,\phi_S) - A_2(\theta-\theta_J,\phi_J)A_1(\theta-\theta_S,\phi_S)} \begin{bmatrix} 0 \\ 1 \end{bmatrix}$$

or $$\begin{bmatrix} M_{I1}(\theta) \\ M_{I2}(\theta) \end{bmatrix} = \begin{bmatrix} \dfrac{-A_2(\theta-\theta_J,\phi_J)}{A_1(\theta-\theta_J,\phi_J)A_2(\theta-\theta_S,\phi_S) - A_2(\theta-\theta_J,\phi_J)A_1(\theta-\theta_S,\phi_S)} \\ \dfrac{A_1(\theta-\theta_J,\phi_J)}{A_1(\theta-\theta_J,\phi_J)A_2(\theta-\theta_S,\phi_S) - A_2(\theta-\theta_J,\phi_J)A_1(\theta-\theta_S,\phi_S)} \end{bmatrix}$$

which agrees with our earlier solution if $\theta_J$ is set to zero as before.

Advantageously, the interference-aided signal acquisition and tracking system described herein is applicable to navigation of many types of spinning vehicles. Performance of the system can be determined by the rate of change of the rotation rate and not by absolute angular velocity. The system may be integrated with accelerometers, in rapidly spinning vehicles such and artillery shells, or with gyros or rotation rate sensors in more slowly rotating vehicles such as missiles or spacecraft. The GPS (Global Positioning System) is utilized as an example of an external navigation signal. However, the rotational tracking technique described may be applied to many different types of navigation signals, such as other radio navigation signals, as well as optical, acoustic, and other types of external signals. Implementations utilizing multiple antennas are discussed herein, but a single antenna array or antenna with multiple sub-elements or taps may also be utilized. For purposes of example, the exemplary embodiments illustrate the situation of a moving vehicle with one or more antennas attached in fixed positions. However, this concept may also be applied to fixed station with one or more movable antenna arrays. The term vehicle in such an embodiment refers to the movable portions of the system.

The interference-aided signal acquisition and tracking system advantageously applies when a large directional interference or jamming signal is present. The system receives this interfering signal and modulates it in a way that is dependent on the rotation angle or attitude of the vehicle or one or more of its components.

It is understood that although the detailed drawings and specific examples describe exemplary embodiments of an Advanced Spinning Vehicle Navigation (ASVN) system, they are for purposes of illustration only. The exemplary embodiments are not limited to the precise details and descriptions described herein. For example, although particular ranges and architectures are described, other ranges and architectures could be utilized according to the principles of the present invention. Various modifications may be made and the details disclosed without departing from the spirit of the invention as defined in the following claims.

What is claimed is:

1. An interference-aided signal acquisition and tracking system comprising:
   a vehicle having at least two receivers configured to detect external signals, the at least two receivers having an output dependent on attitude of the vehicle;
   an interference detector that measures the output of at least one of the at least two receivers, wherein the interference detector comprises a rotation tracker that provides a rotation estimate;
   a noise canceller that combines the output of the at least two receivers, wherein the noise canceller comprises an interference cancellation controller that applies modulations to null an interference signal as a function of the rotation estimate; and
   a signal processor that extracts a desired signal from the output of the noise canceller, wherein the output of the interference detector is used to control the noise canceller as to reject unwanted signals and enhance performance of the signal processor in extruding the desired signal.

2. The system of claim 1, wherein the vehicle is a missile.

3. The system of claim 1, further comprising phase modulators.

4. The system of claim 1, wherein the interference detector comprises an analog intensity detector.

5. The system of claim 1, wherein the interference detector and noise canceller are embodied in programed instructions in a rotation preprocessor.

6. The system of claim 1, wherein the noise canceller modulates to null interference in the detected external signals.

7. A method of signal acquisition and tracking comprising:

receiving external signals at a spinning vehicle;

measuring the received external signals;

providing a rotation estimate of the rotation of the spinning vehicle;

modulating the received external signals to null an interference signal; and extracting a desired signal from the combined external signals.

8. The method of claim 7, wherein modulating the received signals to null an interference signal comprises combining the measured external signals and rejecting unwanted signals.

9. The method of claim 7, further comprising correcting phase of an output signal from the modulation for rotation effects.

10. The method of claim 7, wherein modulating the received external signals is performed on a pre-satellite basis using satellite geometry information.

11. A signal acquisition and tracking system where interference is cancelled for jamming immunity with spinning vehicles operating in interference environments, the system comprising:

a number of signal receivers associated with a spinning vehicle;

a rotation tracker that obtains signals from the number of signal receivers and provides a rotation estimate;

a global positioning system (GPS) processor that provides satellite geometry information; and an interference cancellation controller that obtains the rotation estimate and the satellite geometry information and modulates to null interference received by the number of signal receivers.

12. The system of claim 11, wherein the signal receivers are antennas on a missile.

13. The system of claim 11, wherein the modulation done by the interference cancellation controller is done on a per-region-of-sky basis.

14. The system of claim 11, wherein the modulation done by the interference cancellation controller is done on a per-satellite basis.

15. The system of claim 11, wherein the interference cancellation controller corrects the phase of the signals from the number of signal receivers for rotation effects.

16. The system of claim 11, wherein the interference cancellation controller predetermines modulation commands as functions of roll and pitch angles.

17. The system of claim 11, wherein the rotation tracker and interference cancellation controller are implemented by an application specific integrated circuit (ASIC).

* * * * *